United States Patent
Nahavandi

(10) Patent No.: US 11,123,247 B2
(45) Date of Patent: Sep. 21, 2021

(54) LOAD SENSOR CONFIGURATIONS FOR CASTER ASSEMBLIES OF A PATIENT SUPPORT APPARATUS

(71) Applicant: Stryker Corporation, Kalamazoo, MI (US)

(72) Inventor: Kurosh Nahavandi, Portage, MI (US)

(73) Assignee: Stryker Corporation, Kalamazoo, MI (US)

( * ) Notice: Subject to any disclaimer, the term of this patent is extended or adjusted under 35 U.S.C. 154(b) by 547 days.

(21) Appl. No.: 16/046,150

(22) Filed: Jul. 26, 2018

(65) Prior Publication Data

US 2019/0029901 A1 Jan. 31, 2019

Related U.S. Application Data

(60) Provisional application No. 62/537,659, filed on Jul. 27, 2017.

(51) Int. Cl.
| | |
|---|---|
| *A61G 7/05* | (2006.01) |
| *A61G 7/08* | (2006.01) |
| *B60B 33/00* | (2006.01) |
| *B60B 33/04* | (2006.01) |
| *G01D 5/00* | (2006.01) |
| *G01L 1/22* | (2006.01) |

(Continued)

(52) U.S. Cl.
CPC .......... *A61G 7/0528* (2016.11); *A61G 7/0527* (2016.11); *A61G 7/08* (2013.01); *B60B 33/00* (2013.01); *B60B 33/045* (2013.01); *G01D 5/00* (2013.01); *G01L 1/2237* (2013.01); *G01L 17/00* (2013.01); *A61G 2203/10* (2013.01); *A61G 2203/32* (2013.01); *A61G 2203/34* (2013.01); *A61G 2203/38* (2013.01); *A61G 2203/44* (2013.01); *B60B 9/00* (2013.01); *B60B 33/0068* (2013.01); *B60B 2200/242* (2013.01)

(58) Field of Classification Search
CPC ...... A61G 7/0528; A61G 7/0527; A61G 7/08; B60B 33/00; B60B 33/045; G01D 5/00; G01L 1/2237; G01L 17/00
USPC ............................. 5/600, 86.1, 83.1, 81.1 R
See application file for complete search history.

(56) References Cited

U.S. PATENT DOCUMENTS

| | | |
|---|---|---|
| 5,823,278 A | 10/1998 | Geringer |
| 5,831,221 A | 11/1998 | Geringer et al. |

(Continued)

*Primary Examiner* — Robert G Santos
(74) *Attorney, Agent, or Firm* — Howard & Howard Attorneys PLLC

(57) ABSTRACT

A patient support apparatus comprises a base supported by caster assemblies with each caster assembly comprising a stem, a caster wheel, and a caster wheel axle. A patient support surface is coupled to the base and is configured to receive a load. One or more load sensors are integrated with at least one of the stem, the caster wheel, or the caster wheel axle for measuring the load. One or more of the caster assemblies can be coupled to a steering motor, which controls orientation of the caster assembly. A controller can control the steering motors based on analyzing the measurements of the load sensor. The load sensors can produce measurements indicative of both vertical load and non-vertical load applied to the caster assembly. The controller can also analyze the measurements of the load sensor to determine the load received by the patient support surface by negating the non-vertical load.

16 Claims, 10 Drawing Sheets

(51) Int. Cl.
    *G01L 17/00*     (2006.01)
    *B60B 9/00*     (2006.01)

(56) References Cited

U.S. PATENT DOCUMENTS

| | | | | |
|---|---|---|---|---|
| 5,861,582 | A * | 1/1999 | Flanagan | G01G 3/13 |
| | | | | 177/144 |
| 7,282,652 | B1 | 10/2007 | Johnson et al. | |
| 9,259,369 | B2 * | 2/2016 | Derenne | A61G 7/012 |
| 9,833,366 | B2 * | 12/2017 | DeLuca | A61G 1/0287 |
| 10,004,651 | B2 * | 6/2018 | DeLuca | A61G 7/0528 |
| 10,568,792 | B2 * | 2/2020 | Derenne | B60B 33/0086 |
| 2014/0076644 | A1 * | 3/2014 | Derenne | A61G 7/012 |
| | | | | 180/19.2 |
| 2014/0352060 | A1 * | 12/2014 | Hirose | A61G 7/0527 |
| | | | | 5/310 |
| 2015/0300872 | A1 | 10/2015 | Hirose et al. | |
| 2016/0081592 | A1 | 3/2016 | Ishikawa et al. | |
| 2016/0089283 | A1 | 3/2016 | DeLuca et al. | |
| 2016/0136018 | A1 * | 5/2016 | DeLuca | A61G 7/0524 |
| | | | | 5/611 |
| 2017/0119607 | A1 * | 5/2017 | Derenne | B60B 33/0086 |
| 2019/0029901 | A1 * | 1/2019 | Nahavandi | G01L 17/00 |

\* cited by examiner

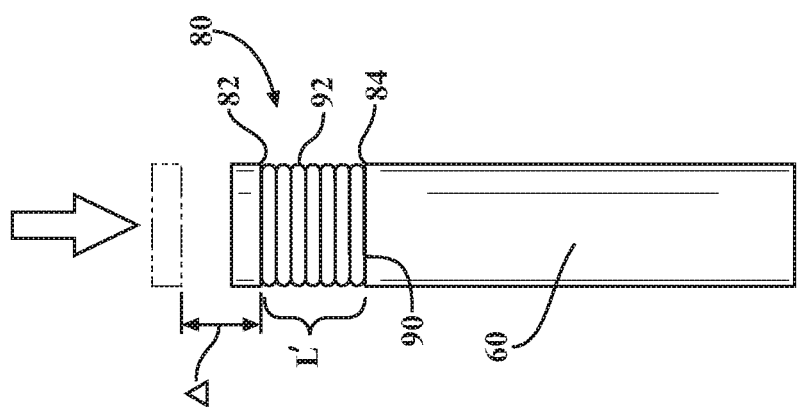
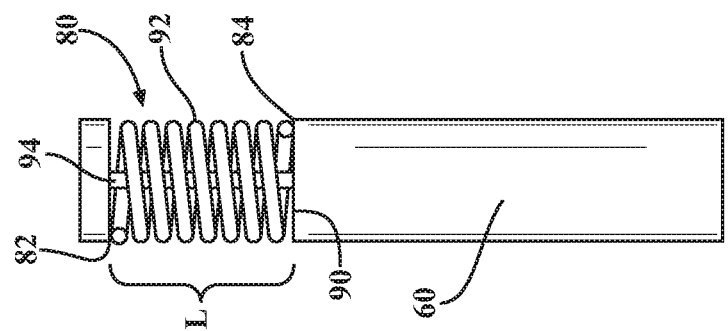
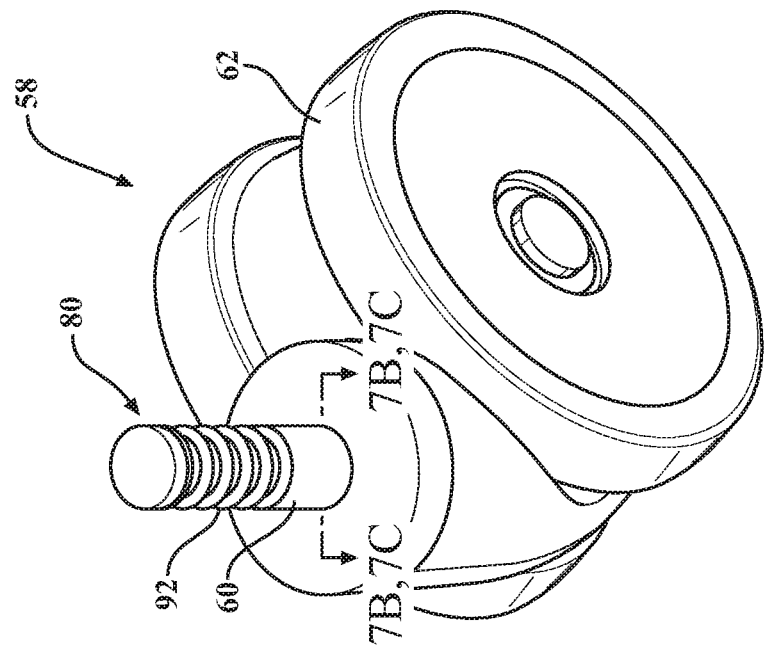
FIG. 7C
FIG. 7B
FIG. 7A

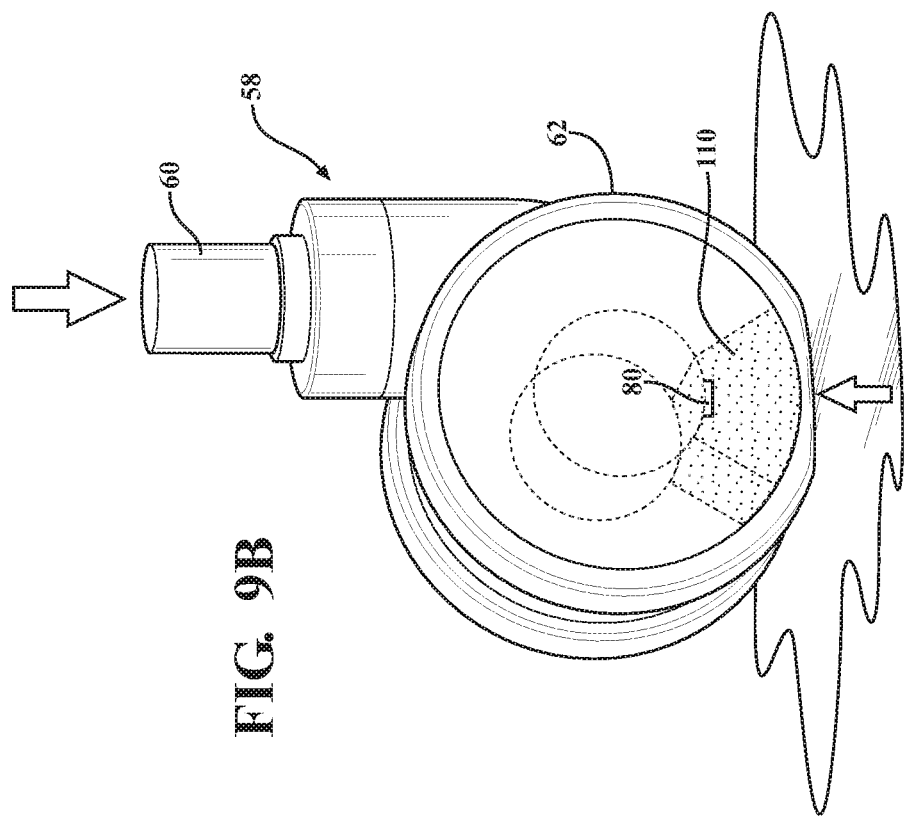
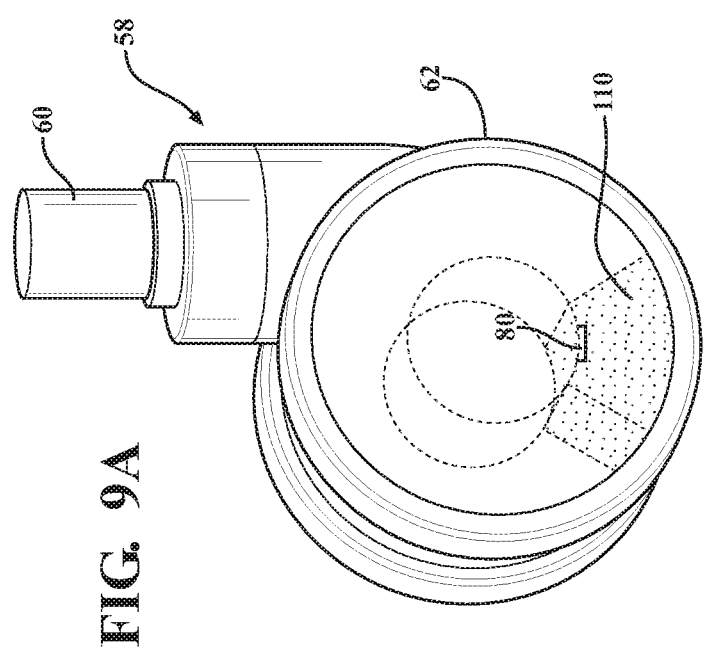

LOAD SENSOR CONFIGURATIONS FOR CASTER ASSEMBLIES OF A PATIENT SUPPORT APPARATUS

RELATED APPLICATIONS

This application claims the benefit of and priority to U.S. provisional patent application No. 62/537,659, filed on Jul. 27, 2017, the entire contents and disclosure of which are hereby incorporated by reference.

BACKGROUND

Patient support apparatuses such as hospital beds, stretchers, cots, wheelchairs, and chairs are routinely used by operators to move patients from one location to another. Conventional patient support apparatuses comprise a base and a support surface upon which the patient rests. Wheels are coupled to the base to enable transport over floor surfaces.

Often, sensors are placed by the support surface for sensing a load applied to the support surface by the patient. Through the force of gravity, a path of the load is transmitted from the support surface, through the base, and ultimately through the wheels to the floor upon which the patient support apparatus rests.

Having the sensors placed by the support surface has many shortcomings. For example, to achieve accurate load readings, the support surface must be as horizontal as possible (e.g., not tilted in litter/fowler/gatch/trend positions) at the time of load measurement. Mainly, tilting of the support surface may cause some of the load to be applied along load paths that circumvent the sensors. However, keeping the support surface horizontal is not always practical because the patient often requires movement or tilting of the support surface for convenience or health related purposes. Physical movement of the patient on the support surface may also cause inaccurate readings when the sensors are placed by the patient support surface. Leaning or posture adjustment of the patient may similarly cause some of the load to be applied along load paths that evade the sensors. As such, when the sensors are placed by the support surface, the sensors are placed in a position that has potential to be bypassed, in part, by the load path. In turn, this may also inhibit the ability for accurate load readings. A patient support apparatus with features designed to overcome one or more of the aforementioned challenges is desired.

BRIEF DESCRIPTION OF THE DRAWINGS

FIG. 7A is a perspective view of the caster assembly comprising the load sensor integrated on the distal end of the stem, according to another example.

FIG. 7B is a cross-sectional view of the stem and load sensor of the caster assembly of FIG. 7A wherein the stem and the load sensor are at rest.

FIG. 7C is the cross-sectional view of the stem and load sensor of FIG. 7B wherein the stem is undergoing an applied load detectable by the load sensor.

FIG. 9A is a perspective view, partially in phantom, of the caster assembly comprising load sensor integrated with a wheel of the caster assembly wherein the wheel is at rest.

FIG. 9B is the perspective view of the caster assembly of FIG. 9A wherein the wheel is undergoing an applied load detectable by the load sensor.

DETAILED DESCRIPTION

I. Patient Support Apparatus Overview

Figure 1:
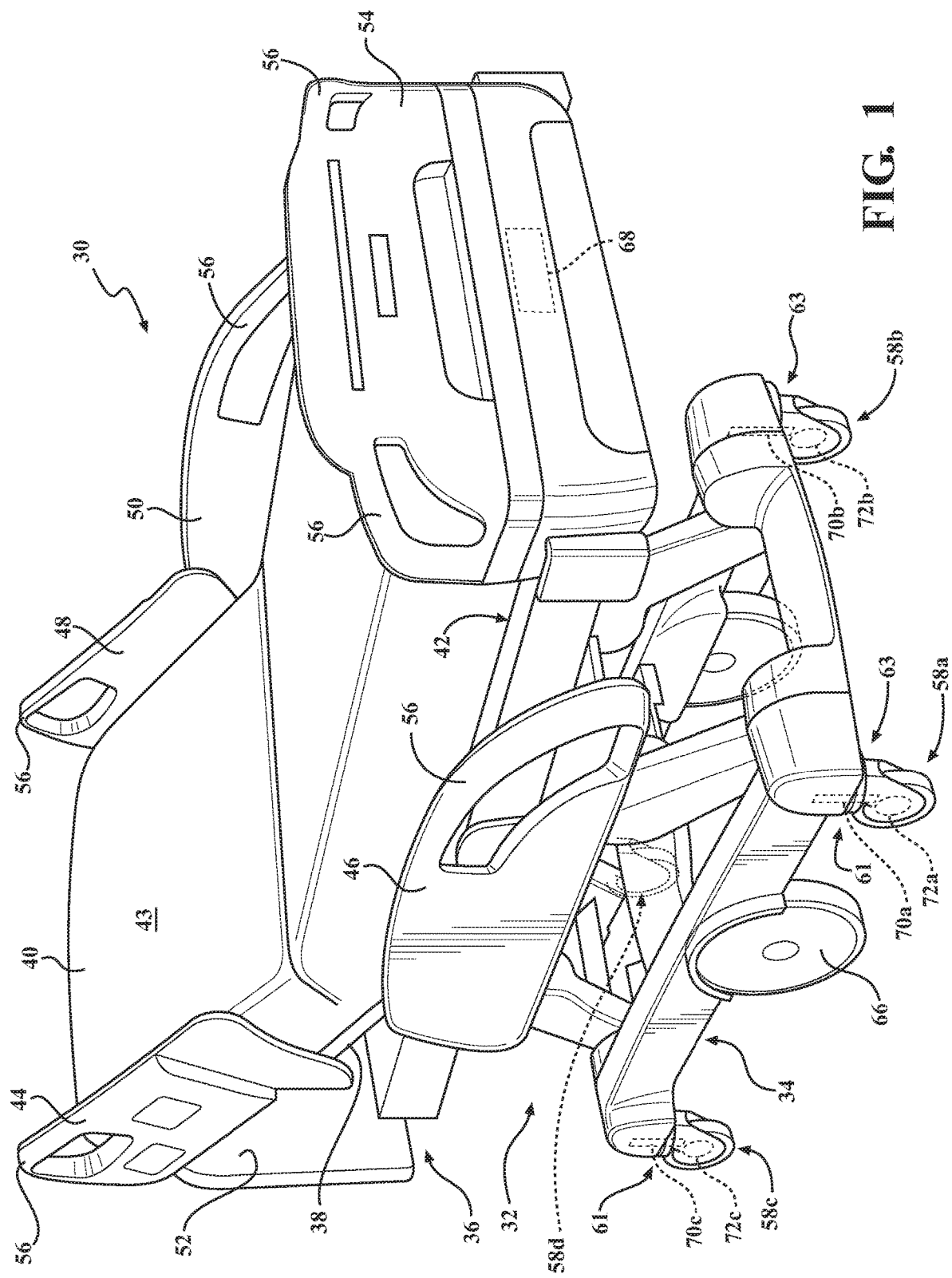
FIG. 1 is perspective view of a patient support apparatus.

Referring to FIG. 1, a patient support apparatus 30 is shown for moving a patient from one location to another. The patient support apparatus 30 illustrated in FIG. 1 is a hospital bed. In other embodiments, however, the patient support apparatus 30 may be a stretcher, cot, wheelchair, chair, or similar apparatus.

A support structure 32 provides support for the patient during movement of the patient support apparatus 30. The support structure 32 illustrated in FIG. 1 comprises a base 34 and an intermediate frame 36. The intermediate frame 36 is spaced above the base 34. The support structure 32 also comprises a patient support deck 38 disposed on the intermediate frame 36. The patient support deck 38 may comprise several sections, some of which are pivotable relative to the intermediate frame 36, such as a head section, a seat section, a thigh section, and a foot section. The patient support deck 38 provides a patient support surface 42 upon which the patient is supported. The patient support surface 42 is supported by the base 34.

A mattress 40 is disposed on the patient support deck 38. The mattress 40 comprises a direct patient support surface 43 upon which the patient is supported. The base 34, intermediate frame 36, patient support deck 38, and patient support surfaces 42, 43 each have a head end and a foot end corresponding to the designated placement of the patient's head and feet on the patient support apparatus 30. The construction of the support structure 32 may take on any suitable design, and is not limited to that specifically set forth above or shown in FIG. 1.

Side rails 44, 46, 48, 50 are coupled to the intermediate frame 36. A first side rail 44 is positioned at a right head end of the intermediate frame 36. A second side rail 46 is positioned at a right foot end of the intermediate frame 36. A third side rail 48 is positioned at a left head end of the intermediate frame 36. A fourth side rail 50 is positioned at a left foot end of the intermediate frame 36. If the patient support apparatus 30 is a stretcher or a cot, there may be fewer side rails. The side rails 44, 46, 48, 50 are movable between a raised position in which they block ingress and egress into and out of the patient support apparatus 30, one or more intermediate positions, and a lowered position in which they are not an obstacle to enable such ingress and egress. In still other configurations, the patient support apparatus 30 may not include any side rails.

A headboard 52 and a footboard 54 are coupled to the intermediate frame 36. In other embodiments, when the headboard 52 and footboard 54 are included, the headboard 52 and footboard 54 may be coupled to other locations on the patient support apparatus 30, such as the base 34. In still other embodiments, the patient support apparatus 30 does not include the headboard 52 or the footboard 54.

Operator (human control) interfaces 56, such as handles, are shown integrated into the footboard 54 and side rails 44, 46, 48, 50 to facilitate movement of the patient support apparatus 30 over the floor surfaces. Additional operator interfaces 56 may be integrated into the headboard 52 and/or other components of the patient support apparatus 30. The operator interfaces 56 are graspable by the operator to manipulate the patient support apparatus 30 for movement. The operator interface 56 may comprise one or more handles coupled to the intermediate frame 36. The operator interface 56 may simply be a surface on the patient support apparatus 30 upon which the operator locally applies force to cause movement of the patient support apparatus 30 in one or more directions, also referred to as a push location. This may comprise one or more surfaces on the intermediate frame 36 or base 34. This could also comprise one or more surfaces on or adjacent to the headboard 52, footboard 54, and/or side rails 44, 46, 48, 50. In other embodiments, the operator interface 56 may comprise separate handles for each hand of the operator. For example, the operator interface 56 may comprise two handles. Other forms of the operator interface 56 are also contemplated.

One or more caster assemblies 58 are coupled to the base 34 to facilitate transport over floor surfaces. In one example, as shown in FIG. 1, four caster assemblies 58a-58d are arranged in each of four quadrants of the base 34 adjacent to corners of the base 34. In the embodiment shown, the caster assemblies 58a-58d are able to rotate and swivel relative to the support structure 32 during transport.

The caster assemblies 58 may be non-steerable, steerable, non-powered, powered (driven), or any combinations thereof. The caster assemblies 58 may have any suitable shape or configuration other than those shown in the Figures.

The patient support apparatus 30 may comprise any suitable number of caster assemblies 58, such as two or six, etc. The caster assemblies 58 may have any suitable configuration and arrangement depending on the specific type of patient support apparatus 30. For example, when the patient support apparatus 30 is a wheelchair, the patient support apparatus 30 may comprise two front non-driven caster assemblies 58 and two rear driven caster assemblies 58.

Figure 2A:
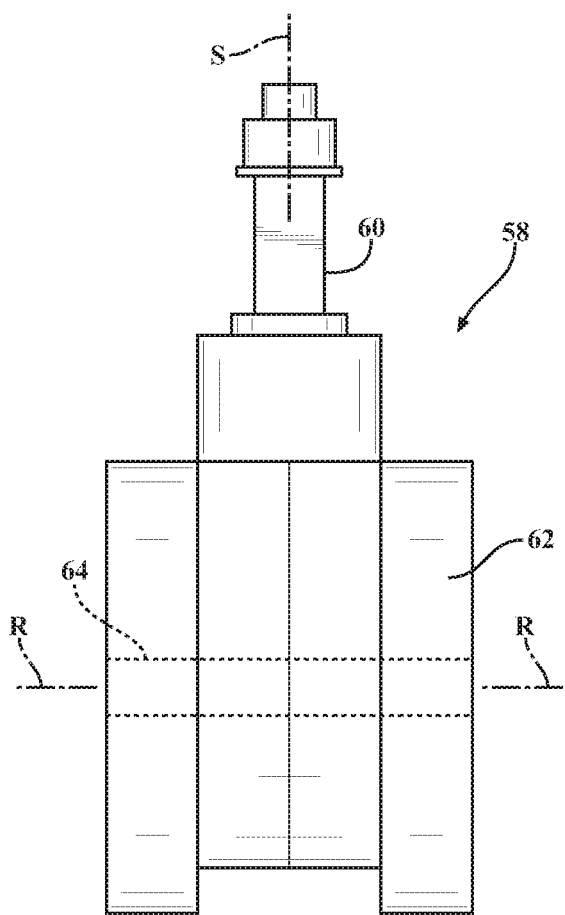
FIG. 2A is an elevational view, partially in phantom, of a caster assembly of the patient support apparatus according to one embodiment.
Figure 2B:
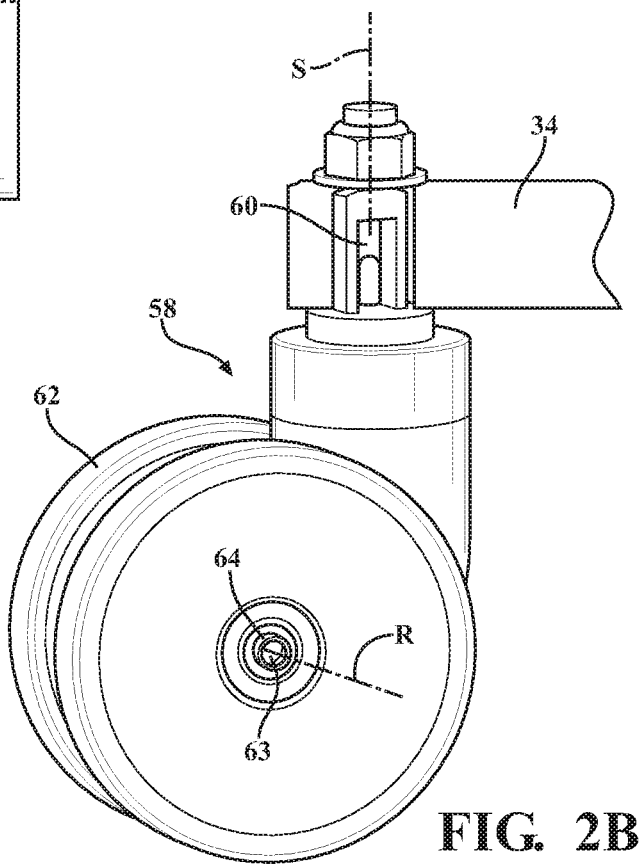
FIG. 2B is perspective view of the caster assembly of FIG. 2A.

As shown in FIGS. 2A and 2B, each caster assembly 58 comprises a stem 60, a caster wheel 62, and a caster wheel axle 64. The caster wheel 62 rotates about a rotational axis R of the wheel axle 64 to effect motion of the patient support apparatus 30, such as along a floor surface. The caster wheel 62 has a radial center 63. The caster wheel 62 may be an airless (non-pneumatic) wheel or may be an inflatable, pneumatic or semi-pneumatic wheel. The stem 60 extends from the caster assembly 58 to provide an interface connection to the base 34, as shown in one example of FIG. 2B. The stem 60 may be any suitable shape, such as cylindrical, box shaped, or the like. The caster assembly 58, and more specifically, the stem 60 may be coupled to the base 34 according to any suitable manner and using any suitable fastening mechanism.

The caster wheel 62 rotates vertically about a swivel axis S defined through the stem 60. The stem 60 and swivel axis S may be offset with respect to the radial center 63 of the caster wheel 62, as shown in FIG. 2B. In other words, the swivel axis S and the rotational axis R do not directly intersect. In such instances, the caster wheel 62 exhibits a trailing orientation, meaning a bulk, offset portion, of the caster wheel 62 trails behind the swivel axis S when the caster wheel 62 is in motion. In another example, the swivel axis S is aligned with the radial center 63 and intersects the rotational axis R of the caster wheel 62. In such instances, the caster wheel 62 has no specific trailing orientation and either side of the caster wheel 62 may trail behind the swivel axis when the caster wheel 62 is in motion.

Caster assemblies 58 and structures, functions and applications thereof may be like those described in U.S. Patent Application Publication No. 2016/0089283, entitled "Patient Support Apparatus," the disclosure of which is hereby incorporated by reference in its entirety.

Additionally, one or more auxiliary wheels 66 (powered or non-powered), which may be movable between stowed positions and deployed positions, may be coupled to the support structure 32. In some cases, when these auxiliary wheels 66 are located between the caster assemblies 58 and contact the floor surface in the deployed position, they cause two of the caster assemblies 58 to be lifted off the floor surface thereby shortening a wheel base of the patient support apparatus 30. Such auxiliary wheels 66 may also be arranged substantially in a center of the base 34.

The patient support apparatus 30 comprises a controller 68 in communication with and for controlling any suitable components of the patient support apparatus 30, such as the electrical or electromechanical components described herein. The controller 68 may comprise any suitable signal processing means, computer executable instructions or software modules stored in non-transitory memory wherein the executable instructions or modules may be executed by a processor, or the like. Additionally, or alternatively, the controller 68 may comprise a microcontroller, a processor, one or more integrated circuits, logic parts, and the like for enabling the same. The controller 68 may have any suitable configuration for enabling performance of various tasks related to operation of the patient support apparatus 30, such as those described below. The controller 68 may be located at any suitable location of the patient support apparatus 30.

As shown in FIG. 1, the patient support apparatus 30 may comprise one or more steering motors 70a-70d for changing an orientation of the caster assemblies 58 about the swivel axis S. The steering motor 70 may be coupled to the stem 60 of the caster assembly 58. Each steering motor 70 may change the orientation of the caster assemblies 58 to facilitate steering of the patient support apparatus 30. For example, the steering motors 70 may change orientation of the caster assemblies 58 help to move patient support apparatus 30 in the direction desired by the caregiver. One steering motor 70 may be associated with each caster assembly 58, and more specifically, the stem 60 of the caster assembly 58. Alternatively, the steering motors 70 may be associated with only certain caster assemblies 58, e.g., the front-leading caster assemblies 58a, 58b. The steering motors 70 may be located inside or outside the respective caster assembly 58.

Figure 3:
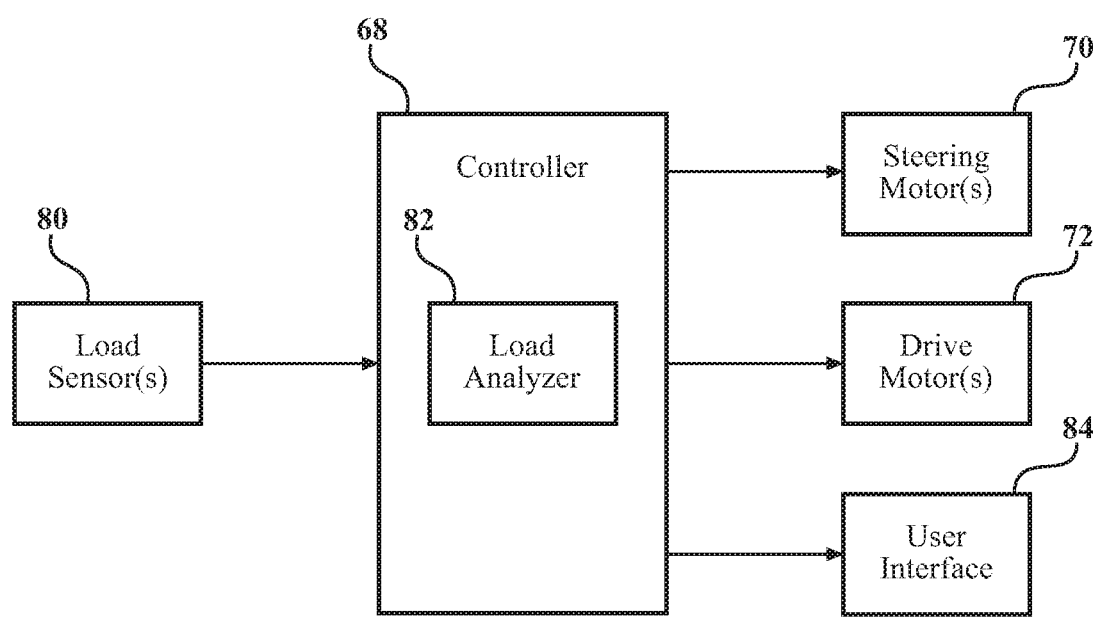
FIG. 3 is a block diagram of one embodiment of a system of the patient support apparatus comprising a load sensor, a controller, and motors for controlling the caster assembly.

Referring to FIG. 3, the steering motors 70 are coupled to the controller 68. The steering motors 70 may be directly wired to the controller 68 or in wireless communication with the controller 68. The steering motors 70 may receive control signals from the controller 68 commanding reorientation of the respective caster assemblies 58. For example, the control signals may be derived from the controller 68 receiving readings indicative of user applied force and direction of force when pushing patient support apparatus 30. Additional examples of control signals provided by the controller 68 to effect reorientation by the steering motors 70 are described below. Steering motors 70 and techniques for generating signals for controlling the same may be like those described in U.S. Patent Application Publication No. 2016/0089283, entitled "Patient Support Apparatus," the disclosure of which is hereby incorporated by reference in its entirety.

In embodiments where one or more caster assemblies 58 are driven, a drive motor 72a-72d may be associated with the respective caster assembly 58, as shown in FIG. 1. The drive motor 72 is configured to cause the caster assembly 58 to rotate about the rotational axis R of the caster assembly 58. The drive motor 72 may be coupled to the caster wheel axle 64. Referring to FIG. 3, the drive motors 72 are coupled to the controller 68. The drive motors 72 may be directly wired to the controller 68 or in wireless communication with the controller 68. The drive motor 72 is configured to cause the caster assembly 58 to rotate in response to receiving control signals provided by the controller 68. For example, the controller 68 may command the drive motor 72 to rotate the respective caster assembly 58 to effect a desired velocity for the patient support apparatus 30 based on user input and/or sensed readings relating to the environment of the patient support apparatus 30. The drive motor 72 may be located inside of the respective caster assembly 58. Drive motors 72 and techniques for generating signals for controlling the same may be like those described in U.S. Patent Application Publication No. 2016/0089283, entitled "Patient Support Apparatus," the disclosure of which is hereby incorporated by reference in its entirety.

II. Load Sensor Configurations for Caster Assemblies

Referring to FIGS. 3-9, the patient support apparatus 30 comprises one or more load sensors 80 that are utilized for measuring a load applied to the patient support apparatus 30. For instance, the load is applied to one or more of the patient support surfaces 42, 43. The load may be applied from any object, such as a patient, placed on one or more of the patient support surfaces 42, 43. The load is not applied when the object is removed or otherwise not placed on one or more of the patient support surfaces 42, 43. Specific structural embodiments and locations of load sensors 80 in relation to the patient support apparatus 30 are described below.

More specifically, the load sensor 80 is integrated into and/or with the caster assembly 58, or components thereof. That is, the load sensor 80 is integrated with the caster assembly 58 during manufacturing/assembly of the caster assembly 58. In other words, by being integrated with the caster assembly 58, the load sensor 80 is not disposed on a component that is separate from the caster assembly 58 or a component that is otherwise not involved with functionality of the caster assembly 58. Instead, the load sensor 80 is "in-line" with the caster assembly 58 thereby eliminating a need for secondary support structures, such as cantilevers, separately attached to the caster assembly 58 for experiencing the load and holding the load sensor 80. Installation of the caster assembly 58 having the integrated load sensor 80 is made seamlessly to the base 34 without including additional features coupled to the base 34 and/or caster wheel 58 for accommodating such secondary support structures for the load sensor 80.

As will be shown in the various examples below, the load sensor 80 is cooperative with at least one of the stem 60, the caster wheel 62, and the caster wheel axle 64 of the caster assembly 58 to measure the load. One or more load sensors 80 are affixed, attached, or otherwise directly coupled to the stem 60, the caster wheel 62, and/or the caster wheel axle 64, individually, or in combination. In other examples, the load sensor 80 is coupled to the steering motor 70 and/or the drive motor 72, when such motors 70, 72 are integrated with the caster assembly 58.

Furthermore, by having the load sensor 80 integrated with the caster assembly 58, there is an opportunity to avoid placing load sensors 80 by the patient support surfaces 42, 43. Mainly, the path of the load transmitted from the patient support surfaces 42, 43 will ultimately bottle-neck and pass through the caster assemblies 58 to the floor upon which the patient support apparatus 30 rests. Therefore, having the load sensors 80 integrated with the caster assemblies 58 provides a unique opportunity to accurately and completely capture the applied load. Because the caster assemblies 58 are usually placed on a horizontal and stable floor surface, load sensors 80 will also be in a horizontal state thereby providing accurate readings. Thus, the described configuration avoids the shortcomings of having the support surfaces 42, 43 be as horizontal as possible (e.g., not tilted) at the time of load measurement to provide accurate readings. Even if the support surfaces 42, 43 are tilted in litter/fowler/gatch/trend positions, the load path must find its way through the caster assembly 58 such that circumvention of the load sensors 80 by the load path is unlikely. Thus, integrating the load sensor 80 with the caster assembly 58 will provide free tilting of the support surfaces 42, 43 for convenience or health related purposes of the patient, even during load measurement.

The described configuration further provides accurate readings even with physical movement of the patient on the support surfaces 42, 43 during load measurement. Leaning or posture adjustment of the patient is unlikely to cause some of the load to be applied along load paths that evade the load sensor 80 because the load sensor 80 is provided at the caster assembly 58 near the floor, and at a low and bottle-necked point in the load path. Additional advantages of the load sensor 80 configurations will be appreciated from the examples described below and those shown in the figures.

Of course, there may be other load sensors disposed in locations of the patient support apparatus 30 other than being integrated on or within the caster assembly 58. These other load sensors may be utilized in conjunction with or separately from any load sensor 80 integrated with the caster assembly 58.

As used herein, the term "load sensor" is not limited to a sensor only configured to measure the load directly. Since the load may be difficult to characterize based on sensor readings alone, and because various types of load sensors 80 are provided herein, it should be understood that load sensor 80 may produce readings that are indicative of, or corresponding to, the load such that the load can be inferred based on such readings. Examples of such readings are understood from the various examples of the load sensor 80, as described below.

Figure 5:
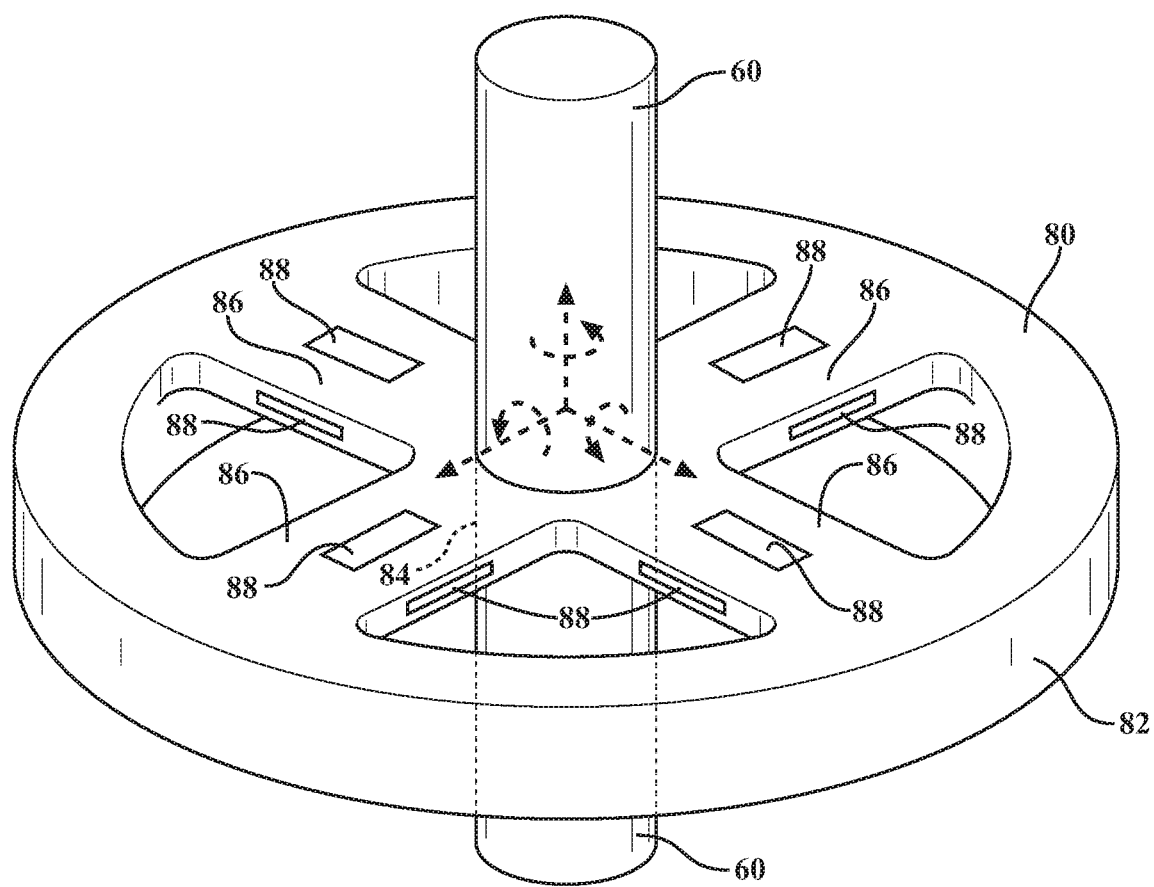
FIG. 5 is a perspective view, partially in phantom, of another example of the load sensor integrated around the stem of the caster assembly.

The load sensor 80 integrated with the caster assembly 58 may have any suitable configuration for sensing the load. For example, the load sensor 80 may be any type of load cell, such as a strain gauge load cell, a piezoelectric load cell, a hydraulic load cell, a pneumatic load cell, or the like. The load cell may be bending beam, compression, push-pull rod type or the like. The load cell may measure forces/torques applied by the load in any number of degrees of freedom, such as six degrees of freedom, as shown in FIG. 5, including forces along axes X, Y, Z and torques (pitch, roll, yaw) about these axes, respectively. The load cell may have configurations other than those described herein.

The load sensor 80 integrated with the caster assembly 58 may also comprise one or more strain gauges for converting strain caused by the applied load into signals. The strain gauges may be any suitable type, such as foil type, piezoresistive type, semiconductor based, microelectromechanical system (MEMS) type, or the like. The strain gauges may have configurations other than those described herein.

In other examples, the load sensor 80 integrated with the caster assembly 58 is a pressure sensor for converting pressure caused from the applied load into signals. The pressure sensor may use any suitable technology, such as piezoresistive, capacitive, electromagnetic, piezoelectric, and the like. The sensed pressure may be applied to any suitable medium, such as pressure applied to liquid, solid or gases. The pressure sensor may have configurations other than those described herein.

The load sensor 80 integrated with the caster assembly 58 may be a displacement sensor for converting physical displacement of an object into signals. The displacement sensor may have various configurations, such as a linear, rotational, inductive, capacitive, electrical, encoder based, potentiometric, optical sensors, or the like. The displacement sensor may have configurations other than those described herein.

Any of the examples for the load sensor 80 may be utilized individually, or in combination for any one or more load sensors 80. Any other type of load sensor 80 other than those described herein may be utilized.

As shown in FIG. 3, the load sensors 80 are coupled to the controller 68 and provide readings or measurements to the controller 68. The load sensors 80 may be directly wired to the controller 68 or in wireless communication with the controller 68. When wired, electrical circuits may be passed from the caster assembly 58, through the base 34, and to the controller 68. In wireless configurations, the load sensor 80 may be outfitted with an integrated antenna (e.g., printed circuit board (PCB) antenna) and may communicate using any suitable communication protocol or standard, such as Bluetooth, Zigbee, ISA100.11a, WirelessHART, MiWi, WiFi, near field communication (NFC), or the like. The load sensor 80 and the controller 68 may be coupled according to any suitable network scheme, such as local area network (LAN), body area network (BAN), personal area network (PAN), wireless PAN (WPAN), low-rate WPAN (LR-WPAN), wide area network (WAN), or the like. Communication may occur at any suitable frequency band. The load sensor 80 may also be integrated on a PCB within a larger component, such as a module, which includes additional functionality, such as communication capabilities as described in any of the examples described herein.

The readings of the load sensor 80 may be of different types (e.g., analog, digital, etc.) depending on the configuration of the load sensors 80. The controller 68 may comprise a load analyzer 82 embodied as hardware and/or software for analyzing the readings from the load sensors 80. The load analyzer 82 may also reference a transformation or calibration matrix that is storable in memory of the controller 68. The matrix transforms the raw measurement values from the load sensor 80 into the resulting forces and torques.

The load analyzer 82 may analyze the load readings for making one or more determinations. For instance, the controller 68 may be coupled to a user interface 84, which is configured to receive user input commands and to display information to the user. The load sensors 80 may be utilized as part of a scale system. The load analyzer 82 may determine a weight of the patient based on the readings from the load sensors 80. The determined patient weight may be displayed on the user interface 84. Thus, the load sensors 80 may be understood as weight sensors in certain examples. In other examples, the controller 68 may make determinations for commanding the steering motor 70 and/or drive motor 72 based on an outcome of analyzing the load sensor 80 readings. Examples of motor control based on load sensor 80 readings are provided below.

As shown in the examples of FIGS. 4-7, the load sensor 80 is coupled to the stem 60. Here, the load sensor 80 is configured to measure load applied to the stem 60.

Figure 4B:
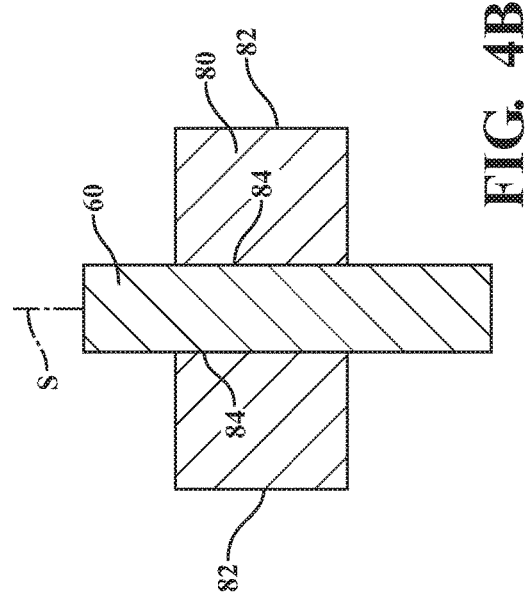
FIG. 4B is a cross-sectional view of the stem and load sensor of the caster assembly of FIG. 4A wherein the stem and load sensor are at rest.
Figure 4C:
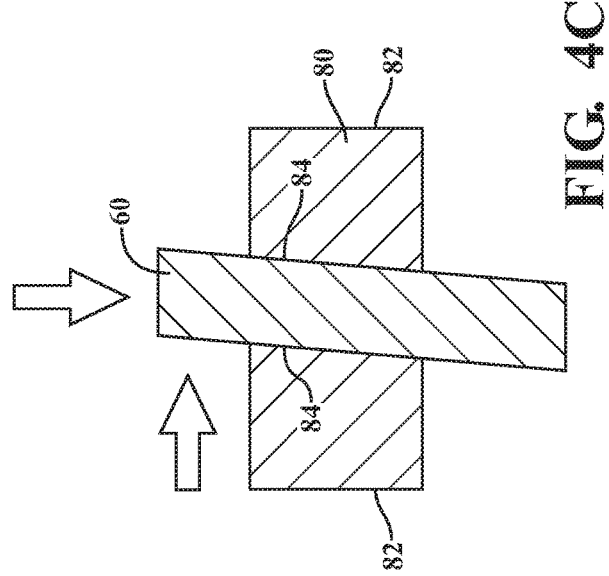
FIG. 4C is the cross-sectional view of the stem and load sensor of FIG. 4B wherein the stem is undergoing an applied load detectable by the load sensor.
Figure 4A:
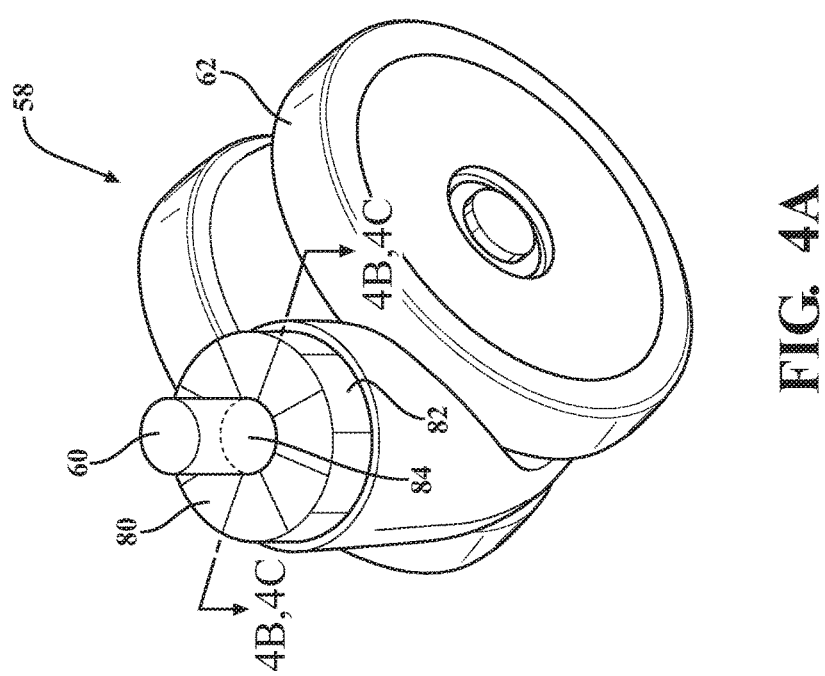
FIG. 4A is a perspective view, partially in phantom, of the caster assembly comprising the load sensor integrated around a stem of the caster assembly, according to one example.

In one example, as shown in FIGS. 4 and 5, the load sensor 80 is disposed about or around the stem 60. Because the stem 60 has a cylindrical configuration in FIG. 4A, the load sensor 80 is disposed annularly or circumferentially about the stem 60. Of course, where the stem 60 has other cross-sectional configurations (e.g., rectangular, etc.), the load sensor 80 may be disposed around any number of edges or faces of the stem 60. The load sensor 80 may entirely surround a portion of the stem 60 (as shown in FIG. 4A). Alternatively, the load sensor 80 may partially surround a portion of the stem 60.

In the embodiment shown in FIGS. 4A-4C, the load sensor 80 is embodied as a load cell. Of course, the load sensor 80 may have other configurations besides or in addition to a load cell in this example. FIG. 4B shows a cross-sectional view of the load sensor 80 and stem 60 of FIG. 4A at rest. FIG. 4C shows a cross-sectional view of the load sensor 80 and stem 60 of FIG. 4A under load. In this example, the load sensor 80 has a disc-shape, but the load sensor 80 may have other shapes. The load sensor 80 is, or has, a deformable member coupled between a first side 82 that is fixed and an opposing second side 84 that moves. The first side 82 is fixed to a rigid structure of the caster assembly 58, such as a housing component (not shown). The second side 84 is coupled to at an inner side to the stem 60 and moves according to movement of the stem 60. The load sensor 80 may comprise any suitable number of strain gauges integrated therewith for sensing strain from the deformation.

The load sensor 80 is configured to undergo compression in response to the load applied to the stem 60 or tension in response to removal of the load. The stem 60 may shift according to any one of six degree of freedoms. In one example, as shown in FIG. 4C, the stem 60 slightly shifts downward due to vertical downward force and shifts at an angle due to non-vertical forces. The resulting circumferential deformation of the surrounding load sensor 80 caused by shifting of the stem 60 is sensed for measuring these vertical and non-vertical forces, if present. The shifting of the stem 60 and deformation of the load sensor 80 in FIG. 4C are exaggerated for illustrative purposes and may not be representative of actual conditions, which may not be directly noticeable to the naked eye. Furthermore, the load sensor 80 may have any suitable thickness other than the thickness shown in FIG. 4C.

In this example, the load sensor 80 configuration can take into account the rotational moment force caused by the offset in caster assembly 58. That is, in situations where the caster assembly 58 is offset, the load applied will tend to pass to the floor through a path that is not directly through the swivel axis S. Instead, load path will pass through the radial center 63 of the caster wheel 62, which is offset from the swivel axis S, as described. Therefore, the load path may take an abrupt deviation from the swivel axis S, thereby causing non-vertical forces that tilt the stem 60, as shown in FIG. 4C. Described below are techniques for compensating for these non-vertical forces.

FIG. 5 shows another example of the load sensor 80 disposed about or around the stem 60. Again, the first side 82 is fixed to a rigid structure of the caster assembly 58 and the second side 84 is coupled to at an inner side to the stem 60. Here, a plurality of spokes 86 connect the fixed and moveable sides 82, 84. The spokes 86 bend in response to application of the load to stem 60. The load sensor 80 in FIG. 5 has four spokes 86, however, any number of spokes 86 may be utilized. A plurality of strain gauges 88 attach to each spoke 86 for measuring the strain on the spoke 86. Each spoke 86 and the strain gauges 88 associated with each spoke 86 collectively form a single-axis load cell in load sensor 80. The spokes 86 bend in response to load applied to the stem 60. As shown in FIG. 5, the strain gauges 88 attach to the top, bottom, and sides of each spoke 86 for measuring strain on the spokes 86 resulting axial loads along the X, Y, and/or Z-axes, and/or rotational loads about the X, Y, and/or Z-axes. As such, the load sensor 80 in FIG. 5 is configured to measure the applied load in six-degree of freedom. The load sensor 80 may be disposed about or around the stem 60 according to configurations other than those shown in FIGS. 4 and 5.

Referring now to FIGS. 6 and 7, another example is shown wherein the load sensor 80 is disposed on a distal end 90 of the stem 60. In this example, the load sensor 80 has the first side 82 fixed to a rigid structure (not shown) of the caster assembly 58 or base 34 and the second side 84 coupled to the distal end 90 of the stem 60. In this example, either the first side 82 or the second side 84 of the load sensor 80 may be coupled to a non-moving member. That is, the stem 60 in this example may be stationary or non-moving, and the rigid structure of the caster assembly 58 or base 34 may move based on the applied load, or vice-versa.

Figure 6B:
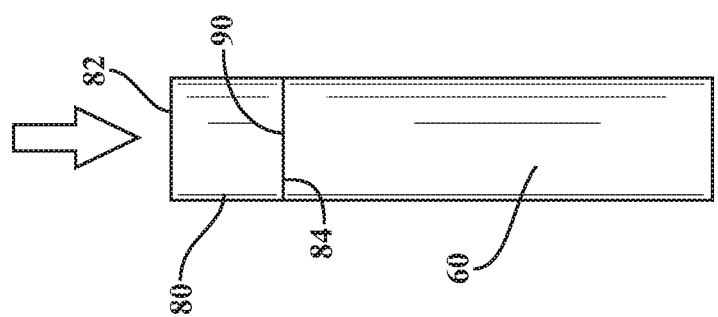
FIG. 6B is a cross-sectional view of the stem and load sensor of the caster assembly of FIG. 6A wherein a load is applied to the distal end of the stem.
Figure 6A:
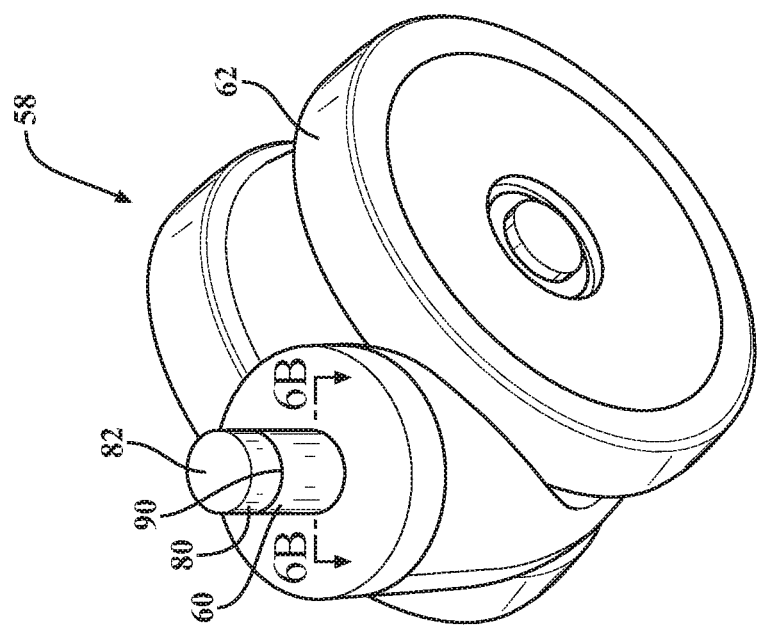
FIG. 6A is a perspective view of the caster assembly comprising the load sensor integrated on a distal end of the stem, according to one example.

In the example of FIGS. 6A and 6B, the load sensor 80 is a load cell configured to measure compressional force applied to the distal end 90 of the stem 60, or absence thereof. Because the stem 60 has a cylindrical configuration in FIG. 6, the load sensor 80 also has a cylindrical configuration. Of course, where the stem 60 has other cross-sectional configurations (e.g., rectangular, etc.), the load sensor 80 may have similar cross-sectional configurations. Alternatively, the load sensor 80 may have a cross-sectional configuration that differs from the cross-sectional configuration of the stem 60. The load sensor 80 may entirely occupy a surface area of the distal end 90 of the stem 60 (as shown in FIG. 6). Alternatively, the load sensor 80 may occupy a portion of the surface area of the distal end 90. The load sensor 80 may be coupled to the distal end 90 according to any means that preserves accurate load measurement, such as mechanical mounting, adhesive, welding, or the like.

FIG. 6B shows a cross-sectional view of the load sensor 80 and stem 60 of FIG. 6A under load. The load sensor 80 is, or has, a compressive medium coupled between the first and second sides 82, 84. The compressive medium may be a solid, liquid or gas. The load sensor 80 may be hermetically sealed to be airtight from the environment. The load sensor 80 may have a low-profile to not interfere with installation or connection of the caster assembly 58 to the base 34. The load sensor 80 may have any suitable thickness other than the thickness shown in FIG. 6B. The load sensor 80 is configured to undergo compression in response to the load applied to the distal end 90. In one example, as shown in FIG. 6B, the load sensor 80 compresses (not shown) due to vertical downward force. The resulting compression of the load sensor 80 is sensed for measuring these vertical downward forces, if present. Compression of the load sensor 80 in FIG. 6B may not be directly noticeable to the naked eye. In this example, the compression load sensor 80 may similarly take into account the rotational moment force caused by the offset in caster assembly 58, as described above.

FIGS. 7A-7C illustrate another example of the load sensor 80 being disposed on the distal end 90 of the stem 60. In this example, the load sensor 80 is a displacement sensor configured to undergo displacement in response to the load applied to the distal end 90 of the stem 60. The load sensor 80 measures the resulting displacement, which is indicative of the applied load. The controller 68 can convert displacement readings into force readings using the load analyzer 82 and any suitable transformation matrix. In FIG. 7A-7C, the displacement sensor is embodied with a biasing member 92, such a coil spring. Other biasing members 92 other than a coil spring may be utilized, such as tension (torsion) spring, leaf (flat) spring, conical springs, wire ring springs, or the like. The biasing member 92 may have any appropriate spring constant, which can be calibrated for expected loads applied to the patient support apparatus 30. In this example, the load sensor 80 has a cylindrical shape, but the load sensor 80 may have other shapes, as described.

In this example, the load sensor 80 has the first side 82 fixed to a rigid structure of the caster assembly 58 or base 34 and the second side 84 coupled to the distal end 90 of the stem 60. In this example, either the first side 82 or the second side 84 of the load sensor 80 may be coupled to a non-moving member. That is, the stem 60 in this example may be stationary or non-moving, and the rigid structure of the caster assembly 58 or base 34 may move based on the applied load, or vice-versa. Specifically, in FIG. 7, the first side 82 of the biasing member 92 is coupled to a plate 94 that is in-line with the distal end 90. A plunger 96 is coupled between the plate 94 and the distal end 90 of the stem 60. The load sensor 80 may comprise any suitable sensor, such as those described above, for measuring displacement of the biasing member 92, plate 94 and/or plunger 95.

FIG. 7B shows a cross-sectional view of the load sensor 80 and stem 60 of FIG. 7A at rest. FIG. 7C shows a cross-sectional view of the load sensor 80 and stem 60 of FIG. 7A under load. At rest, the biasing member 92 has a length L, as shown in FIG. 7B. Under load, the biasing member 92 has a different length, L', which will vary depending on the magnitude of the load. The biasing member 92 compresses when a vertical downward force is applied to the distal end 90. Such compression may be due to force applied downward from movement of the plate 94 and/or from upward force applied from movement of the stem 60. The length L' of the biasing member 92 decreases as compared with the length L in the at-rest state as a result of this compression. The resulting displacement is shown by Δ in FIG. 7C, which is a difference between L and L'. In FIG. 7, the displacement is measured in the Z-direction. However, it should be appreciated that the displacement may be according to any other direction or directions depending on the configuration of the biasing member 92. For example, displacement may be measured in a rotational fashion, e.g., by measuring how much the biasing member 92 has twisted based on the load, or the like.

In some examples, more than one load sensor 80 may be stacked on top of one another over the distal end 90 of the stem 60. These stacked load sensors 80 may be of a similar or a different configuration from one another. Furthermore, load sensors 80 coupled directly to the distal end 90 of the stem 60 may have configurations other than those shown in FIGS. 6 and 7 and may measure load according to techniques other than those shown.

Referring now to FIG. 8, another example is illustrated wherein the load sensor 80 is coupled to the caster wheel axle 64 and is configured to measure load applied to the caster wheel axle 64. The caster wheel axle 64 comprises a first end 100 and a second end 102, which are coupled to the caster wheel 62. These ends 100, 102 may be fastened to the caster wheel 62 using any suitable means, such as bolts as shown in FIG. 8, or the like.

The load sensor 80 may be disposed according to any suitable fashion in cooperation with the caster wheel axle 64, or any part thereof. For example, as shown in FIG. 8, the load sensor 80 is disposed on a surface of the caster wheel axle 64 and along the rotational axis R of the caster wheel axle 64. The load sensor 80 may have any suitable length along the caster wheel axle 64. For example, the load sensor 80 may extend along an entirety or a portion of the length of the caster wheel axle 64. More than one load sensor 80 may extend along the rotational axis R of the caster wheel axle 64 and such load sensors 80 may be disposed circumferentially on opposing faces of the caster wheel axle 64, e.g., four load sensors 80 being 90 degrees apart from one another.

Additionally or alternatively, one or more load sensors 80 may be disposed annularly or circumferentially about the caster wheel axle 64 and the rotational axis R. One or more load sensors 80 may entirely surround a portion of the caster wheel axle 64 or may partially surround a portion of the caster wheel axle 64. Such load sensors 80 may be disposed laterally on opposing sides of the caster wheel axle 64, e.g., every 1 mm along the length of the caster wheel axle 64.

Additionally or alternatively, one or more load sensors 80 may be coupled to each of the ends 100, 102 of the caster wheel axle 64 for sensing the load. In such scenarios, the load sensors 80 may measure a sheer force applied between the caster wheel axle 64 and the ends 100, 102 of the caster wheel axle 64.

Figure 8B:
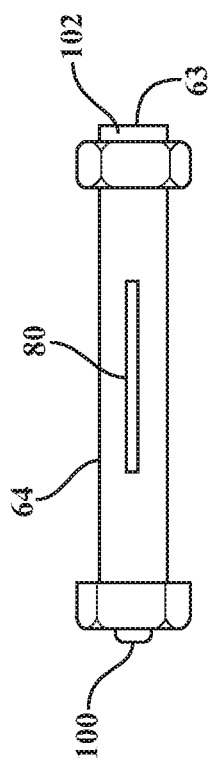
FIG. 8B is an elevational view of the wheel axle and the load sensor of the caster assembly of FIG. 8A wherein the wheel axle and the load sensor are at rest.
Figure 8C:
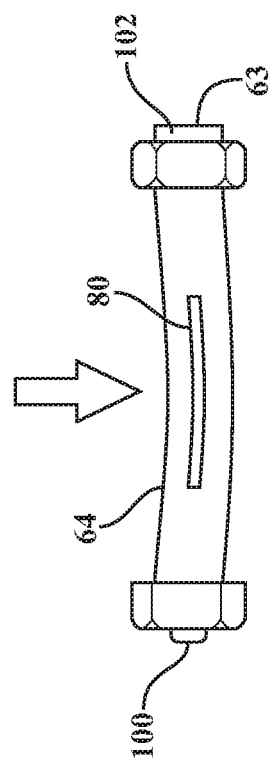
FIG. 8C is the elevational view of the wheel axle and the load sensor of FIG. 8B wherein the wheel axle is undergoing an applied load detectable by the load sensor.
Figure 8A:
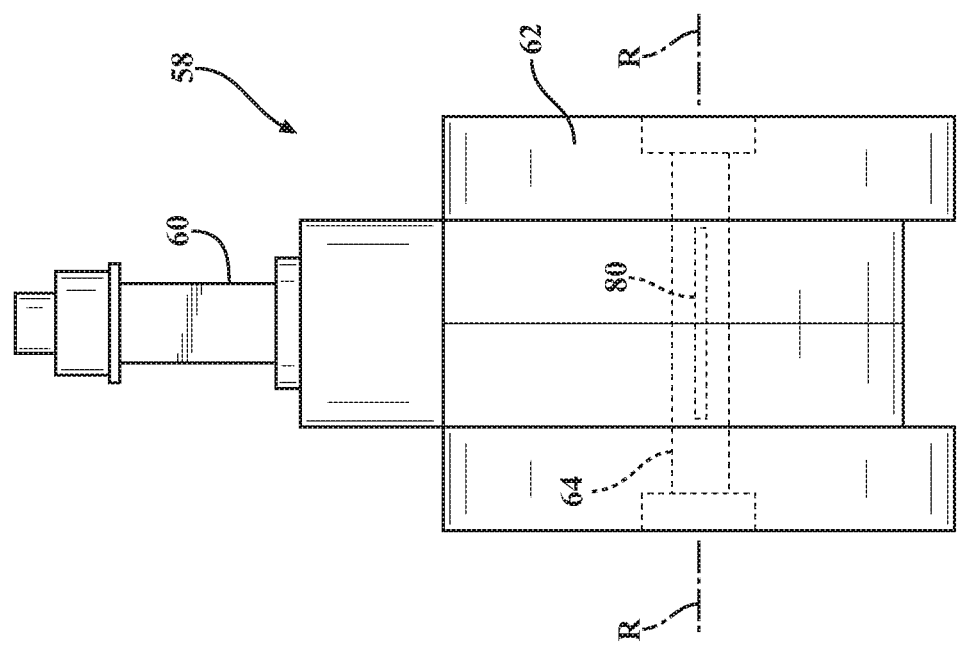
FIG. 8A is an elevational view, partially in phantom, of the caster assembly comprising the load sensor integrated on a wheel axle of the caster assembly, according to one example.

In the embodiment shown in FIGS. 8A-8C, the load sensor 80 is embodied as a load cell. The load sensor 80 may comprise any suitable number of strain gauges integrated with the caster wheel axle 64 for sensing strain from the application of the load to the caster wheel axle 64. Of course, the load sensor 80 integrated with the caster wheel axle 64 may have any other configuration besides or in addition to a load cell, such as those described above.

FIG. 8B shows an isolated view of the load sensor 80 and caster wheel axle 64 of FIG. 8A at rest. FIG. 8C shows the load sensor 80 and caster wheel axle 64 of FIG. 8A under load. The load sensor 80 is configured to undergo compression or tension, depending on its positioning, in response to the load applied to the caster wheel axle 64 or in response to removal of the load. The caster wheel axle 64 may bend or deform along according to any one of six degree of freedoms. In one example, as shown in FIG. 8C, the caster wheel axle 64 slightly bends downward due to vertical downward force from the load. The resulting deformation of the caster wheel axle 64 is sensed by the load sensor 80 for measuring this vertical force, if present. The bending of the caster wheel axle 64 and the load sensor 80 in FIG. 8C are exaggerated for illustrative purposes and may not be representative of actual conditions, which may not be directly noticeable to the naked eye.

As with the above examples, the load sensor 80 configuration in FIG. 8 is also equipped to take into account the rotational moment force caused by the offset in caster assembly 58. As described, the load path with the offset caster assembly 58 will pass through the radial center 63 and/or rotational axis R of the caster wheel 62. Therefore, sensing the load on the caster wheel axle 64 is particularly suitable for accounting for rotational moment force caused by the offset because the caster wheel axle 64 is directly in the offset load path. The load sensors 80 may be cooperative with the caster wheel axle 64 for sensing the load according to configurations other than those described herein.

In another embodiment, the load sensor 80 may be integrated with the caster wheel 62. In such examples, the load sensor 80 is configured to measure load applied to caster wheel 62. The load sensor 80 may be integrated with the caster wheel 62 according to various manners. For instance, the load sensor 80 may be integrated with any one or more of an interior surface of the caster wheel 62, an exterior surface of the caster wheel 62, an interior volume 110 of the caster wheel 62, and/or any other component of the caster wheel 62, such as a wheel rim, wheel tread, wheel disc, wheel bearing, wheel fastener, wheel valve stem, wheel belt, wheel braking or steering member, or the like. Any number of load sensors 80 may be integrated with the caster wheel 62.

In one example, as shown in FIG. 9, the caster wheel 62 is an inflatable type and comprises pressurized air within the interior volume 110 of the caster wheel 62. In FIG. 9, the pressurized air is shown only for a portion of the interior volume 110 for simplicity. In this example, the load sensor 80 is embodied as a pressure sensor configured to measure air pressure of the caster wheel 62. The load sensor 80 may be disposed at any suitable location for measuring air pressure. As shown in FIG. 9, the load sensor 80 is disposed in the interior volume 110 of the caster wheel 62. For example, the load sensor 80 is coupled to a surface of the caster wheel 62 that defines the interior volume 110, such as the wheel rim. The load sensor 80 may be integrated directly at the wheel valve stem of the caster wheel 62 or integrated on a flexible band coupled to the wheel rim. However, as described, other locations for the load sensor 80 are contemplated. In this example, the load sensor 80 wirelessly transmits readings to the controller 68 using any of the techniques described herein, or the like.

FIG. 9A shows the load sensor 80 measuring air pressure of the caster wheel 62 when the caster wheel 62 is at rest, e.g., without load being applied. FIG. 9B shows the load sensor 80 measuring air pressure of the caster wheel 62 when load is applied to the caster wheel 62. The applied load causes compression of the interior volume 110 of the inflatable caster wheel 62 relative to the floor surface, as shown in FIG. 9B. As a result, the pressure of the air within the interior volume 110 increases. This increase in air pressure is indicative of the applied load and is detected by the load sensor 80. The controller 68 can convert pressure readings into force readings using the load analyzer 82 and any suitable transformation matrix. The load sensor 80 may measure air pressure according to other techniques not described herein.

In other examples for measuring air pressure, the load sensor 80 may measure physical characteristics of the caster wheel 62 such that the controller 68 and load analyzer 82 can implement algorithms (such as spectrum analysis) to predict the air pressure. Such physical characteristics may comprise angular velocity of the caster wheel 62, frequencies emitted by the caster wheel 62 during rotation, and the like.

The caster wheel 62 may be an airless (non-inflatable) wheel, wherein the interior volume 110 is occupied by solid material, such as compressible rubber, polymer, etc. In such examples, air pressure is non-existent, and the load sensor 80 instead may be embodied as a load cell or strain gauge integrated on and/or within the solid material. As the solid material of the caster wheel 62 compresses under the applied load, the load sensor 80 is able to the detect strain indicative of the load. The load sensor 80 may be integrated with the caster wheel 62 according to techniques other than those described herein.

As with the above examples, the load sensor 80 configuration in FIG. 9 is also equipped to take into account the rotational moment caused by the offset in caster assembly 58. As described, the load path with the offset caster assembly 58 will pass through the radial center 63 and/or rotational axis R of the caster wheel 62. Therefore, sensing the load on the caster wheel 62 is particular suitable for accounting for rotational moment caused by the offset because the caster wheel 62 is directly in the offset load path.

Figure 10A:
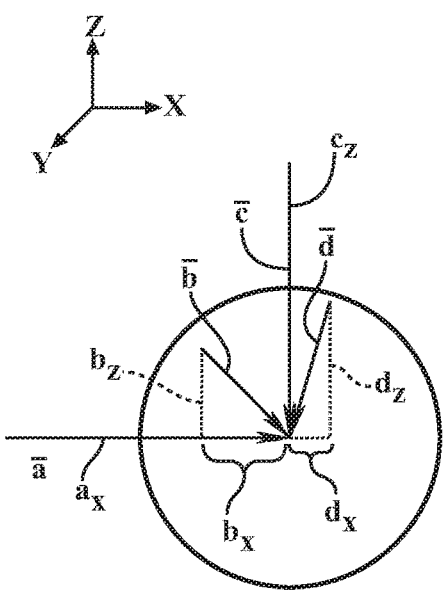
FIG. 10A is a diagram illustrating vertical and non-vertical components of a load detected by the load sensor of the caster assembly, according to one example.
Figure 10B:
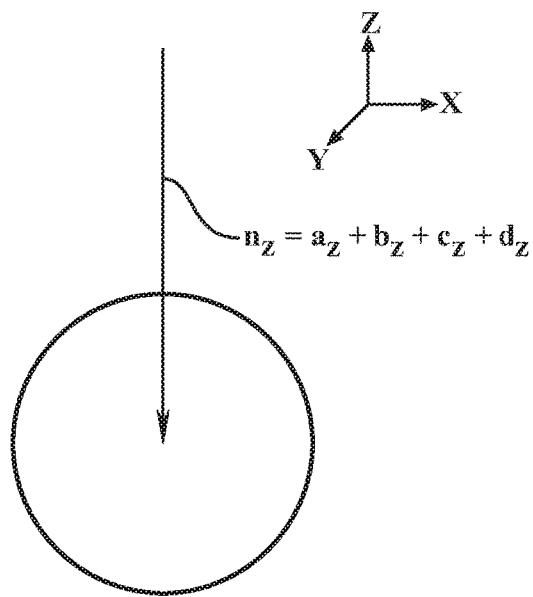
FIG. 10B is a diagram illustrating a combined vertical component of the load from FIG. 10A wherein non-vertical components of the load are negated by the controller.
Figure 11:
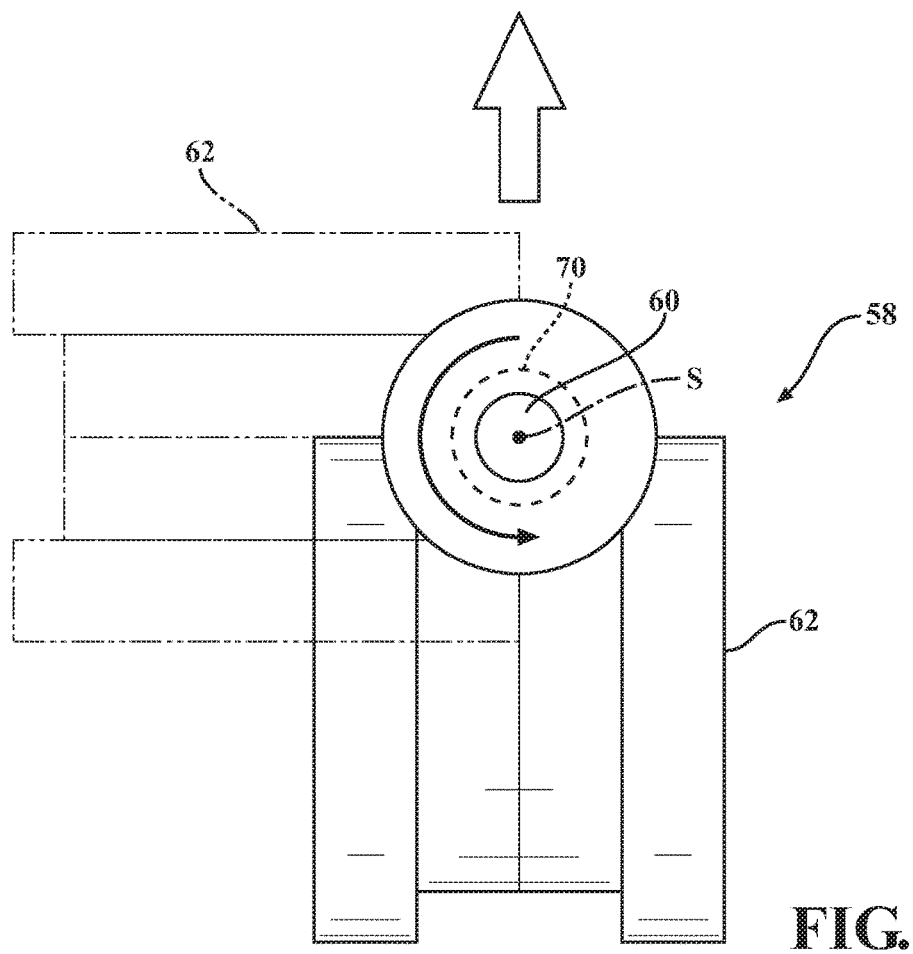
FIG. 11 is a top view of the caster assembly in a trailing position after being rotated from a non-trailing position by a steering motor based on the load detected by the load sensor.

Referring now to FIGS. 10 and 11, techniques are described for analyzing readings of the load sensor 80 with the controller 68 and executing control schemes based on analysis of the load sensor 80 readings.

As described, the load sensor 80, in many embodiments, is configured to measure the load according to many degrees of freedom. In other words, the applied load may have various components of force and/or torque. For instance, as described throughout, the load on the caster wheel 62 may comprise rotational moment caused by the offset nature of the caster wheel 62. Thus, the components of force and/or torque may have magnitude and direction. The direction of the load components may depend on many factors, such as the load path, the configuration and/or location of the load sensor 80 on the caster assembly 58, the nature of the applied load, and the like.

Because the load sensor 80 is particularly configured for the patient support apparatus 30, accurately measuring the weight of the patient based on the sensed load is important. In order to accurately measure the patient weight, the primary focus of the applied load is a vertical component of the load, e.g., load in the downward Z-axis direction. For example, the vertical component of the load may be understood as the load component directed from the patient support surfaces 42, 43 to the floor surface. However, the load sensor 80 may produce measurements indicative of vertical load and non-vertical load applied to the caster assembly 58, as described above. These non-vertical components may be rotational moments and/or forces in non-vertical directions, such as in the X or Y-axis directions.

Upon receiving the load measurements from the load sensor 80, the controller 68, and load analyzer 82, may be configured to analyze the measurements to decompose these vertical and non-vertical components of the load. The controller 68 is configured to utilize computer-implemented techniques for negating the non-vertical components of the load. As a result, the controller 68 can output load determinations based on the vertical component of the load. The controller 68 may use software for implementing these techniques and may include known geometric data, such as calibration data, about the caster assembly 58 or any component thereof, and about the load sensor 80 for analyzing the load.

To illustrate according to one simplified example, FIG. 10A is a diagram illustrating vertical and non-vertical components of the load applied to a rigid body as detected by the load sensor 80. As illustrated, the controller 68 decomposes the load into four separate vectors, i.e., a, b, c, d. In this example, the vectors each have a vertical component $a_z$, $b_z$, $c_z$, $d_z$, which is a Z-axis downward force, and a non-vertical component, $a_x$, $b_x$, $c_x$, $d_x$, which in this example is an X-axis horizontal force. Here, vector a is purely horizontal and therefore has a vertical component $a_z$ equal to zero. Vector c is purely vertical and therefore has a non-vertical component $c_x$ equal to zero. Vectors b and d have non-zero vertical and non-vertical components. Of course, illustration of these load components in FIG. 10 is for illustrative purposes and the controller 68 may decompose the load with or without any such visualization.

FIG. 10B is a diagram illustrating a combined vertical component of the load from FIG. 10A wherein non-vertical components of the load are negated by the controller 68. Here, the controller 68 negates, or otherwise factors out the non-vertical components $a_x$, $b_x$, $c_x$, $d_x$ decomposed from the applied load and preserves the vertical components $a_z$, $b_z$, $c_z$, $d_z$. Specifically, the controller 68 generates a vector n having a vertical component $n_z$ having a magnitude based on the combination of the magnitudes of the vertical components $a_z$, $b_z$, $c_z$, $d_z$. In turn, the controller 68 can use computer-implemented techniques to extract the vertical component from the applied load quickly and accurately.

The phrases "vertical" and "non-vertical" with respect to the load, or components thereof, are orientation specific, i.e., Z-axis direction and non-Z-axis direction, respectively. However, it is fully contemplated that the controller 68 can negate any component of the load depending on the component of the load desired for extraction. For instance, the controller 68 may alternatively negate the vertical load where extraction of the horizontal load is desired. Furthermore, the example in FIG. 10 shows vector components only for forces along the Z and X-axes. As described, the load may comprise rotational moments about any of the axes and therefore, the controller 68 may extract and/or negate any rotational moments. The controller 68 may do so using advanced vector analysis or any other mathematical technique.

Referring to FIG. 11, one example of control executed by the controller 68 in response to analysis of the load sensor 80 readings is described. In this example, the caster assembly 58 is an offset-type and therefore has a trailing orientation. The load sensor 80 is integrated with the caster assembly 58 according to any technique described herein.

The controller 68 analyzes the load sensor 80 readings to determine a state of the caster assembly 58. Specifically, the controller 68 can determine a location and/or orientation of the caster assembly 58 based on the load readings. For example, using techniques wherein the load sensor 80 is disposed around the stem 60 such as shown in FIGS. 4 and 5, the load sensor 80 detects circumferential strain relative to the stem 60. Using this detection alone, or in conjunction with stored calibration data, the controller 68 can determine that the caster wheel 62 is in a specific orientation.

For instance, as shown in FIG. 11, the offset caster assembly 58 is shown in a top view in a first state (shown in phantom). Because of the offset configuration, the load sensor 80 detects a rotational moment. The rotational moment is detected about an axis that is parallel to position of the rotational axis R of the caster wheel 62. In the first state as shown in FIG. 11, the rotational axis R of the caster wheel 62 extends vertically (from the top view), and hence, the rotational moment would be about an axis that extends vertically across the swivel axis S. From this, the controller 68 can determine the orientation of the rotational axis R, and ultimately, the orientation of the caster wheel 62, which in this example is trailing to the left. Using this technique, the controller 68 can determine the orientation of the caster wheel 62 in full range of motion, e.g., 360 degrees about the swivel axis S.

The weight and bulk of the patient support apparatus 30, including the weight of the patient supported thereon, can make it difficult for a caregiver to manually wheel the patient support apparatus 30 from one location to another. Free rotational movement of the caster assemblies 58 can increase this difficulty. Mainly, much of the effort in initiating movement of the patient support apparatus 30, such as by pushing or pulling on the headboard 52, is directed to first causing caster assemblies 58 to align with the direction of desired movement (shown by the arrow in FIG. 11) so that the caster assemblies 58 have a trailing orientation with respect to the direction of desired movement. In other words, a start-up force needed to move the patient support apparatus 30 with the caster assemblies 58 in a non-trailing orientation is much greater than the start-up force needed to move the patient support apparatus 30 with the caster assemblies 58 aligned in the trailing orientation. Often, the orientation that the caster wheels 62 assumed when the patient support apparatus 30 was placed in a room is the opposite orientation that the caster wheels 62 need to assume in order to move the patient support apparatus 30 out of the room.

To minimize such effort, the controller 68 is configured to control the steering motor 70 of the caster assembly 58 in response to the orientation of the caster assembly 58 as determined based on the load sensor 80 readings, as described above. Specifically, the controller 68 is configured to control the steering motor 70 to move the caster assembly 58 to the trailing orientation with respect to the direction of desired movement. In FIG. 11, a second state of the caster assembly 58 (shown in solid lines) is shown in the trailing position relative to the desired direction of movement (arrow). The caster assembly 58 is moved to the trailing position by the steering motor 70 after being rotated from the non-trailing position of the first state.

As such, the techniques described herein provide automatic re-alignment of the caster assembly 58. Such re-alignment may occur before the patient support apparatus 30 is manually moved the operator. For instance, the operator need not be present near the patient support apparatus 30 in order for the re-alignment to occur. This is because re-alignment is based on readings from the load sensor 80 integrated with the caster assembly 58. Therefore, even while the patient support apparatus 30 is stationary, the controller 68 can nevertheless make such determinations because the offset caster wheel 62 load is continuously detectable by the load sensor 80.

In other examples, the controller 68 may command the steering motor 70 to re-align the caster assembly 58 upon detection of movement of the patient support apparatus 30 in the desired direction of movement. Techniques for determining the desired direction of movement of the patient support apparatus 30 may be like those described in U.S. Patent Application Publication No. 2016/0089283, entitled "Patient Support Apparatus," the disclosure of which is hereby incorporated by reference in its entirety.

Although re-alignment to the trailing position has been described, it should be appreciated that the controller 68 can command various other types of re-alignment of the caster assembly 58 based on readings from the load sensor 80. For instance, the controller 68 may command the steering motor 70 to move the caster wheels 62 to non-trailing orientations for purposes, such as steering of the patient support apparatus 30 based on prediction of a change in desired direction, or the like.

It will be further appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The invention claimed is:

1. A patient support apparatus comprising:
a base supported by caster assemblies with each caster assembly comprising a stem, a caster wheel, and a caster wheel axle, wherein one or more of the caster assemblies is coupled to a steering motor configured to control orientation of one or more of the caster assemblies;
a patient support surface coupled to the base and configured to receive a substantially vertically applied load;
a load sensor cooperative with at least one of the stem, the caster wheel, or the caster wheel axle to measure the load; and
a controller configured to:
control the steering motor of one or more of the caster assemblies based on analyzing measurements of the load sensor,
determine an orientation of one or more of the caster assemblies based on the measurements of the load sensor in a substantially vertical direction, and
control the steering motor of one or more of the caster assemblies based on the determined orientation.

2. The patient support apparatus of claim 1, wherein the load sensor is coupled to the stem and configured to measure load applied to the stem.

3. The patient support apparatus of claim 2, wherein the load sensor is a load cell disposed around the stem.

4. The patient support apparatus of claim 2, wherein the load sensor is disposed on a distal end of the stem.

5. The patient support apparatus of claim 4, wherein the load sensor is a load cell configured to measure compressional force applied to the distal end of the stem.

6. The patient support apparatus of claim 4, wherein the load sensor is a displacement sensor configured to undergo displacement in response to the load applied to the distal end of the stem and to measure the displacement.

7. The patient support apparatus of claim 1, wherein the load sensor is coupled to the caster wheel axle and configured to measure load applied to the caster wheel axle.

8. The patient support apparatus of claim 1, wherein the caster wheel comprises pressurized air and wherein the load sensor comprises a pressure sensor configured to measure air pressure of the caster wheel.

9. The patient support apparatus of claim 1, wherein the load sensor is configured to produce measurements indicative of vertical load and non-vertical load applied to each caster assembly.

10. The patient support apparatus of claim 9, wherein the controller is configured to analyze the measurements of the load sensor to determine the load received by the patient support surface by negating the non-vertical load.

11. The patient support apparatus of claim 1, wherein the controller is configured to control the steering motor of the one or more of the caster assemblies to move the one or more of the caster assemblies to a trailing orientation with respect to a direction of desired movement.

12. The patient support apparatus of claim 1, wherein the steering motor is coupled to the stem.

13. The patient support apparatus of claim 1, wherein the load sensor is at least one of a load cell, a strain gauge, a pressure sensor, a displacement sensor, a compression sensor, or a weight sensor.

14. A patient support apparatus comprising:
a base supported by caster assemblies with one or more of the caster assemblies being coupled to a steering motor configured to control orientation of the one or more of the caster assemblies;
a patient support surface coupled to the base and configured to receive a substantially vertically applied load;
a load sensor integrated into the one or more of the caster assemblies and with the load sensor configured to produce measurements indicative of the load; and
a controller configured to:
control the steering motor of the one or more of the caster assemblies based on analyzing the measurements of the load sensor
determine an orientation of the one or more of the caster assemblies based on analyzing the measurements of the load sensor in a substantially vertical direction, and
control the steering motor of the one or more of the caster assemblies based on the determined orientation.

15. The patient support apparatus of claim 14, wherein the controller is configured to control the steering motor of the one or more of the caster assemblies to move the one or more of the caster assemblies to a trailing orientation with respect to a direction of desired movement.

16. The patient support apparatus of claim 14, wherein the one or more of the caster assemblies comprises a stem, wherein the steering motor is coupled to the stem, and wherein the load sensor is a load cell.

* * * * *